United States Patent
Sun et al.

(10) Patent No.: US 12,346,539 B2
(45) Date of Patent: Jul. 1, 2025

(54) METHOD, APPARATUS, DEVICE AND STORAGE MEDIUM FOR MEDIA CONTENT PRESENTING

(71) Applicant: Beijing Zitiao Network Technology Co., Ltd., Beijing (CN)

(72) Inventors: Hui Sun, Shanghai (CN); Miao Deng, Shanghai (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/625,868

(22) Filed: Apr. 3, 2024

(65) Prior Publication Data

US 2024/0248589 A1    Jul. 25, 2024

Related U.S. Application Data

(63) Continuation of application No. PCT/CN2023/103009, filed on Jun. 28, 2023.

(30) Foreign Application Priority Data

Jun. 28, 2022  (CN) .......................... 202210749375.2

(51) Int. Cl.
G06F 3/048   (2013.01)
G06F 3/0484  (2022.01)

(52) U.S. Cl.
CPC .................................. G06F 3/0484 (2013.01)

(58) Field of Classification Search
CPC ...................................................... G06F 3/0484
See application file for complete search history.

(56) References Cited

U.S. PATENT DOCUMENTS 6,490,686 B1 * 12/2002 Wheeler ................. H04L 63/10
                                                              726/33
10,418,064 B2 * 9/2019 Park ..................... G11B 27/034
(Continued)

FOREIGN PATENT DOCUMENTS

CN    1504869 B     9/2010
CN    105142017    12/2015
(Continued)

OTHER PUBLICATIONS

CSDN.net [online], "The corresponding text of audio and video playback is highlighted synchronously and scrolled to the specified position (scrollTop)," Apr. 2017, retrieved on Aug. 2024, retrieved from URL<https://blog.csdn.net/u010018421/article/details/70662467>, 6 pages (with machine translation).
(Continued)

*Primary Examiner* — Linh K Pham
(74) *Attorney, Agent, or Firm* — Fish & Richardson P.C.

(57) ABSTRACT

Embodiments of the disclosure disclose a method, apparatus, device and storage medium for media content presenting, relating to the field of computer technology. The method comprises: presenting a current media content in a target media work including a preset audio and a plurality of media contents in a preset presenting interface and playing the preset audio; determining a target characteristic moment according to a current playing progress of the preset audio and characteristic moment information associated with the preset audio; controlling, when a playing progress of the preset audio reaches the target characteristic moment, the preset presenting interface to switch from presenting the current media content to presenting the next media content.

20 Claims, 5 Drawing Sheets

(56) References Cited

U.S. PATENT DOCUMENTS

| | | | |
|---|---|---|---|
| 11,670,339 B2* | 6/2023 | Han | G06F 3/04842 |
| | | | 715/723 |
| 11,922,974 B1* | 3/2024 | Plankey | G06Q 30/0641 |
| 12,175,576 B2* | 12/2024 | Sun | G11B 27/031 |
| 2005/0111834 A1* | 5/2005 | Oka | G11B 27/034 |
| | | | 386/282 |
| 2006/0012596 A1* | 1/2006 | Fukuya | G06T 19/00 |
| | | | 345/419 |
| 2006/0149781 A1* | 7/2006 | Blankinship | G11B 27/28 |
| 2006/0152678 A1 | 7/2006 | Hung et al. | |
| 2006/0277457 A1* | 12/2006 | Salkind | G06F 16/958 |
| | | | 707/E17.116 |
| 2008/0256449 A1* | 10/2008 | Bhatt | G06F 3/01 |
| | | | 715/720 |
| 2009/0136201 A1* | 5/2009 | Oka | G11B 27/34 |
| | | | 386/E5.028 |
| 2010/0040349 A1 | 2/2010 | Landy | |
| 2012/0236201 A1* | 9/2012 | Larsen | G06Q 30/02 |
| | | | 348/468 |
| 2014/0047413 A1* | 2/2014 | Sheive | G06F 8/33 |
| | | | 717/110 |
| 2014/0219637 A1* | 8/2014 | McIntosh | G11B 20/00007 |
| | | | 386/282 |
| 2014/0270680 A1 | 9/2014 | Bloch et al. | |
| 2014/0323036 A1* | 10/2014 | Daley | H04H 20/38 |
| | | | 455/3.06 |
| 2016/0253087 A1* | 9/2016 | Moon | G06F 3/04883 |
| | | | 715/720 |
| 2017/0347136 A1 | 11/2017 | Frantz et al. | |
| 2019/0215540 A1* | 7/2019 | Nicol | G06V 10/25 |
| 2020/0066297 A1* | 2/2020 | Liu | G06N 3/044 |
| 2020/0312280 A1 | 10/2020 | Ahmed | |
| 2020/0388304 A1 | 12/2020 | Yin | |
| 2021/0165628 A1* | 6/2021 | Boerum | G06F 3/165 |
| 2022/0028427 A1* | 1/2022 | Matsuda | H04N 5/2625 |
| 2022/0076026 A1* | 3/2022 | Walker | G06V 40/161 |
| 2022/0092109 A1* | 3/2022 | Li | G10L 15/02 |
| 2022/0179665 A1* | 6/2022 | Rathod | G06F 9/451 |
| 2022/0188069 A1* | 6/2022 | Zhang | H04N 21/4221 |

FOREIGN PATENT DOCUMENTS

| | | | | |
|---|---|---|---|---|
| CN | 110933487 | | 3/2020 | |
| CN | 112104908 | | 12/2020 | |
| CN | 112527171 | | 3/2021 | |
| CN | 112530472 | | 3/2021 | |
| CN | 112689189 | | 4/2021 | |
| CN | 113365134 | | 9/2021 | |
| CN | 114173175 | | 3/2022 | |
| CN | 114584716 | | 6/2022 | |
| CN | 115062168 | | 9/2022 | |
| CN | 115062168 B | | 10/2024 | |
| WO | WO 2022022262 | | 2/2022 | |
| WO | WO-2022022262 A1 * | | 2/2022 | G10L 13/02 |
| WO | WO-2022225658 A1 * | | 10/2022 | A61K 31/352 |

OTHER PUBLICATIONS

Hao-Su et al., "Design of a multimedia player for embedded Linux system," Electronic Design Engineering, May 2018, 26(9):172-175, 180 (with English abstract).

Office Action in Chinese Appln. No. 202210749375.2, dated Apr. 26, 2024, 19 pages (with English translation).

International Search Report and Written Opinion for International Application No. PCT/CN2023/103009, mailed on Sep. 18, 2023, 9 pages (with English translation).

Extended European Search Report for European Application No. 23830296.2, mailed May 20, 2025, 15 pages.

* cited by examiner

METHOD, APPARATUS, DEVICE AND STORAGE MEDIUM FOR MEDIA CONTENT PRESENTING

CROSS-REFERENCE TO RELATED APPLICATION(S)

This application is a Continuation Application of International Patent Application No. PCT/CN2023/103009 filed on Jun. 28, 2023, which claims priority to Chinese Application No. 202210749375.2 filed in Jun. 28, 2022 and titled "METHOD, APPARATUS, DEVICE AND STORAGE MEDIUM FOR MEDIA CONTENT PRESENTING." The disclosure of above-mentioned applications are incorporated herein by reference in their entities.

FIELD

Embodiments in the disclosure relate to the field of computer technology, for example, to a method, apparatus, device and storage medium for media content presenting.

BACKGROUND

With the continuous development of Internet technology, application (APP) can present a variety of media content to users, and different users can share their works with each other in the form of posting pictures or videos.

SUMMARY

Embodiments in the disclosure provide a method, apparatus, storage medium and device for media content presenting.

In a first aspect, embodiments of the present disclosure provide a method for media content presenting comprising:
  presenting a current media content in a target media work in a preset presenting interface and playing a preset audio, wherein the preset audio and a plurality of media contents are included in the target media work, and the media contents includes at least one of a picture or a video;
  determining a target characteristic moment in real time according to a current playing progress of the preset audio and characteristic moment information corresponding to a characteristic moment associated with the preset audio, wherein the characteristic moment includes a time point when an audio characteristic in the preset audio satisfies a preset condition, and the target characteristic moment is a characteristic moment of the preset audio to play a next media content in the current playing progress;
  controlling, when a playing progress of the preset audio reaches the target characteristic moment, the preset presenting interface to switch from presenting the current media content to presenting the next media content.

In a second aspect, embodiments of the present disclosure further provide an apparatus for media content presenting comprising:
  a media content presenting module (501) configured to present a current media content in a target media work in a preset presenting interface and playing a preset audio, wherein the preset audio and a plurality of media contents are included in the target media work, and the media contents includes at least one of a picture or a video;
  a target characteristic moment determining module (502) configured to determine a target characteristic moment in real time according to a current playing progress of the preset audio and characteristic moment information corresponding to a characteristic moment associated with the preset audio, wherein the characteristic moment includes a time point when an audio characteristic in the preset audio satisfies a preset condition, and the target characteristic moment is a characteristic moment of the preset audio to play a next media content in the current playing progress;
  a media content switching module (503) configured to control, when a playing progress of the preset audio reaches the target characteristic moment, the preset presenting interface to switch from presenting the current media content to presenting the next media content.

In a third aspect, embodiments of the present disclosure further provide an electronic device comprising:
  at least one processor;
  a storage device configured to store at least one program, the at least one program, when executed by the at least one processor, causes the at least one processor to implement a method for media content presenting provided by embodiments of the present disclosure.

In a fourth aspect, embodiments of the present disclosure further provide a readable storage medium containing a computer program which, when executed by a computer processor, performs a method for media content presenting provided by embodiments of the present disclosure.

DETAILED DESCRIPTION OF EMBODIMENTS

Figure 1:
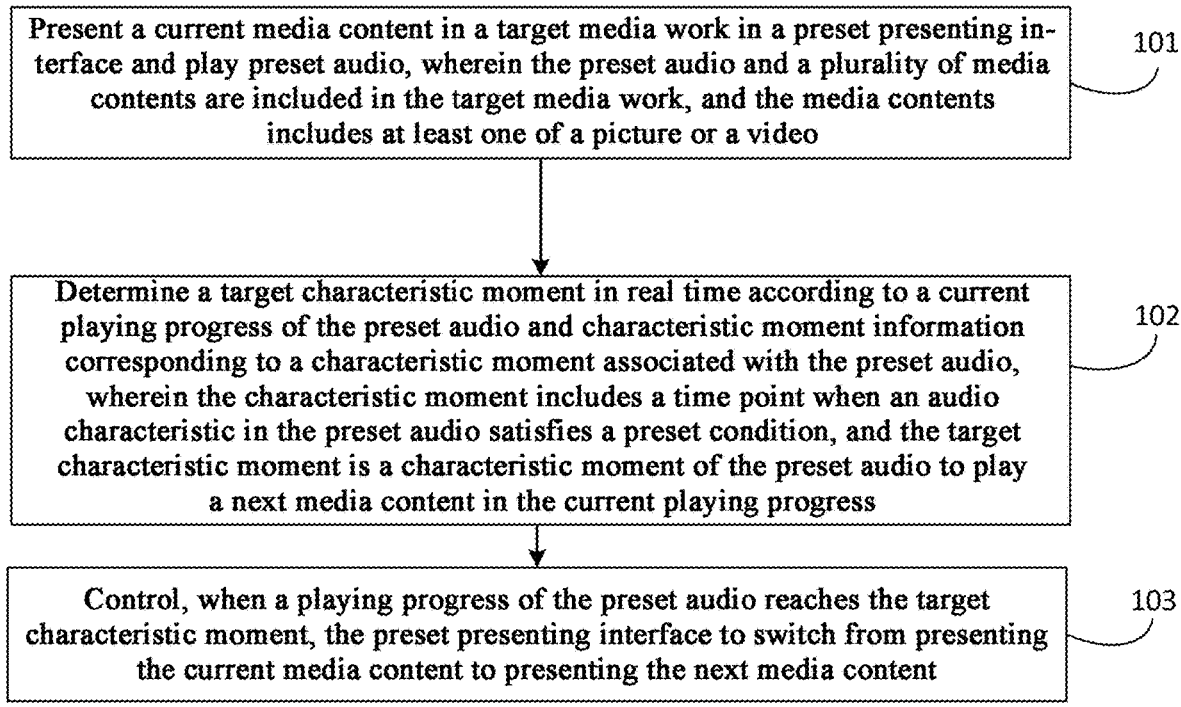
FIG. 1 is a flowchart of a method for media content presenting provided by an embodiment of the present disclosure.

As used herein, the terms "comprises", "comprising", and variations thereof are open-ended terms, i.e. "including, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that references to "first", "second", and the like in this disclosure are only used to distinguish between different devices, modules, or units and are not intended to limit the order or interdependence of the functions performed by the devices, modules, or units.

It is noted that the modifications referred to "a", "an", and "a plurality of" in this disclosure are intended to be illustrative and not restrictive, and those skilled in the art will understand that "at least one" is to be interpreted unless the context clearly indicates otherwise.

It should be understood that before technical solutions disclosed in the embodiments of the present disclosure are used, the user should be informed of the type, scope of use, use scenario, etc. of personal information involved in the present disclosure in an appropriate manner according to relevant laws and regulations and an authorization is obtained from the user.

For example, in response to an active request of a user being received, prompt information is sent to the user to explicitly prompt the user that an operation requested by the user will require the acquisition and use of personal information of the user. Accordingly, the user can autonomously choose whether to provide personal information to software or hardware, such as an electronic device, an application program, a server or a storage medium, which executes operations of technical solutions of the present disclosure, according to the prompt information.

As an alternative but non-limiting implementation, in response to an active request being received from the user, the prompt message may be sent to the user, for example, in the form of a pop-up window in which the prompt message may be presented in text. In addition, the pop-up window may further carry a selection control for the user to select "agree" or "disagree" to provide personal information to the electronic device.

It is to be understood that processes of the notification and acquisition of user authorization as described above are merely illustrative and does not limit implementations of the present disclosure, and that other ways that satisfy relevant laws and regulations may also be applied to implementations of the present disclosure.

It is to be understood that the data involved in this technical solution (including but not limited to the data itself and the acquisition or use of the data) shall comply with the requirements of relevant laws and regulations and relevant provisions.

Currently, as a form of work, a media work is enjoyed by many users. The media work may include audio and multiple pictures. When the work is presented, multiple pictures are displayed in sequence at fixed time intervals in a process of playing audio.

FIG. 1 is a flowchart of a method for media content presenting provided by an embodiment of the present disclosure, and the embodiment of the present disclosure is applicable to the case of media content presenting, and the method may be executed by an apparatus for media content presenting, and the apparatus may be implemented in the form of at least one of software and hardware, and optionally may be implemented by an electronic device, and the electronic device may be a mobile terminal such as a mobile phone, a smart watch, a tablet computer and a personal digital assistant, or may be a device such as a personal computer (PC) or a server.

As shown in FIG. 1, the method comprises:

In step 101, presenting a current media content in a target media work in a preset presenting interface and playing a preset audio, wherein the preset audio and a plurality of media contents are included in the target media work, and the media contents includes at least one of a picture or a video.

In embodiments of the present disclosure, the preset presenting interface may be a interface in a preset application program, and the preset application program may provide a media work presenting function and may further provide a media work posting function, i.e., a user may also view a media work created by himself or posted by others in the preset application program, and may further post a media work created by himself in the preset application program. Audio and a plurality of media contents are included in the media work, and the media contents may include picture(s) or video(s), and the video(s) herein may be understood as continuous multi-frame video images, and may also be referred to as video clips. For example, audio and a plurality of pictures may be included in a media work, and at this time, the media work may be referred to as a picture work; audio and a plurality of (multiple segments of) videos may be included in a media work, and at this time, the media work may be referred to as a multi-segment video work; audio, at least one picture, and at least one video may be included in a media work, and at this time, the media work may be referred to as a shuffled work. The picture(s) or video frames of the video(s) may contain image content(s) or text content(s), etc., among others. The plurality of media contents may constitute a media content set, and the content presenting order of the plurality of media contents in the media content set may be preset, i.e., the plurality of media contents in the target media work are arranged in a preset order. It is to be understood that the plurality of media contents in the target media work may be played back to the first media content again after finish playing. The picture(s) in a media work may be stored in a picture format, the video(s) may be stored in the form of a video file, and the audio may be stored in the form of an audio file, and may generally be stored locally in a service end or an electronic device corresponding to the preset application program.

In embodiments of the present disclosure, the current media content in the target media work is presented in the preset presenting interface, and the target media work may be understood as a media work currently being presented in the preset presenting interface, and the current media content may be understood as a media content currently being presented in the preset presenting interface, which may be a picture or a video, for example, may be any media content in the target media work. The preset audio is played while the current media content is presented. The preset audio is an audio contained in the target media work and may be understood as a background music of the media content. The target media work may include at least one of a media work to be posted and a posted media work, among others.

In step 102, a target characteristic moment is determined in real time according to a current playing progress of the preset audio and characteristic moment information corresponding to a characteristic moment associated with the preset audio, wherein the characteristic moment includes a time point when an audio characteristic in the preset audio satisfies a preset condition, and the target characteristic moment is a characteristic moment of the preset audio to play a next media content in the current playing progress;

For example, in the preset presenting interface, if it is in an automatic switching mode, a plurality of media contents may be automatically presented in sequence according to a content presenting order corresponding to the target media work, which may be a single round of presenting (each media content is presented once), or may be a plurality of rounds of cyclic playing (each media content is presented once and then presented in sequence from the first media content), and so on.

In the related arts, when media contents are displayed in the automatic switching mode, a duration of a single presenting of each media content may be a default setting by the preset application program or may be set autonomously by an author (i.e. a user that creates the media work), i.e., before the presenting, the duration has been set and is generally evenly distributed, and in other words, the duration of the single presenting of each media content is generally equal. In an example regarding a picture work, it is assumed that the picture work contains four pictures, which are respectively recorded as picture a, picture b, picture c and picture d, and further contains audio e, in which the presenting duration of each picture is 2 seconds, and when the picture work starts to be displayed, the audio e is played and the picture a is displayed; and after the presenting duration of the picture a reaches 2 seconds, it is automatically switched to display the picture b; and after the display duration of the picture b reaches 2 seconds, it is automatically switched to display the picture c, and so on, until the presenting of the picture work exits. It can be seen that the timing for switching pictures is determined according to whether the presenting duration reaches a specified duration, and is not associated with the audio, i.e., the media contents and audio are separated, causing a poor viewing effect.

However, in embodiments of the present disclosure, before the media content switching is performed, a next switching opportunity may be dynamically determined according to the current playing progress of the preset audio and the characteristic moment information associated with the preset audio, and the characteristic moment point of music playing corresponding to each media content may change as playing control operations of the use on the target media work differ, so the switching of the media content can more flexibly match the audio characteristic of the audio.

In an exemplary embodiment, the characteristic moment includes a time point at which an audio characteristic in the preset audio satisfies a preset condition. The audio characteristic in the preset audio may include at least one of decibel, frequency, tone, intensity, pitch, amplitude and rhythm included in the preset audio, among others, and are not limited herein. The preset condition may be set according to actual requirements, for example, may be set according to the change of the audio characteristic, or may be set according to whether a value of the audio characteristic is in a preset range. For example, the audio characteristic may be the intensity or rhythm, the characteristic moment may include a moment at which an accent is located, the accent may be understood to be a sound with a greater intensity in a music composition, and be a main note constituting a rhythm, the accent may include a force accent represented by the increased intensity and a tone accent represented by a change in pitch, etc. and the moment at which the accent is located may also be referred to as a rhythm point.

In an exemplary embodiment, after the preset audio is determined, the preset audio may be analyzed to determine a plurality of characteristic moments contained therein so as to obtain characteristic moment information, and the characteristic moment information may include a plurality of characteristic moments arranged in a playing order. In the embodiment, the characteristic moment may be quantified based on the starting and ending times of the preset audio, for example, a characteristic moment appears at 1 minute and 20 seconds in the preset audio, and the characteristic moment may be recorded as 1 minute and 20 seconds, among others. The determination process of the characteristic moment information may be performed before the presenting of the target media work begins. When creating a media work, the author may select a preset audio from an audio library provided by a service-side of a preset application program, and may upload the preset audio locally from an electronic device, etc. With regard to the audio in the audio library, characteristic moment information corresponding to each audio may be obtained through analysis in advance (may be stored in a configuration file), and is stored in association with the corresponding audio for the author to select; with regard to the audio uploaded by the author, the preset application program or corresponding service-side may analyze the audio selected by the user, generate characteristic moment information (which may be stored in the configuration file), and associate the generated characteristic moment information with the selected audio. When it is necessary for a media work presenting to be performed (including an unposted preview presenting), the characteristic moment information may be posted to the preset application program by the service-side. Of course, the characteristic moment of the preset audio may further be dynamically analyzed during the presenting of the target media work to obtain the characteristic moment information, which is not limited herein. It is to be understood that when the target media work is edited, a switch for automatically sticking on music may be provided in an editing panel for the author to choose whether or not to turn on, and at the same time, the author may further select the characteristic moment point, and determine the type of the audio characteristic to be used, etc.

Alternatively, in the case where the author selects the preset audio from the audio library, associated information for the characteristic moment information may be displayed in an associated region for an option that the audio can be alternative in the audio library (such as the right side of the option), wherein the associated information may be, for example, a time interval of every two adjacent characteristic moments, or may be a statistical value (such as an average value) of the time interval, which is beneficial to the author to quickly predict relevant information (such as a gentle rhythm or a happy rhythm) such as a rhythm of the alternative audio according to the associated information, so an audio that closely matches own media contents may be quickly selected, improving the efficiency and accuracy of audio selection to facilitate the author's creation.

In an exemplary embodiment, the current playing progress of the preset audio may be understood as the current playing position in the preset audio, for example, when the preset audio is currently played for the 1st minute and the 17th second, the current playing progress may be 1 minute and 17 seconds. According to the current playing progress and characteristic moment information, a target characteristic moment for switching media contents may be determined; the target characteristic moment is a characteristic moment of the preset audio to play the next media content in the current playing progress, and may be the Nth (N is a positive integer greater than 1) characteristic moment to be played; and it should be noted that the characteristic moment to be played does not include the already played characteristic moment, i.e., the first characteristic moment to be played is not necessarily the first characteristic moment in the preset audio. Here, N may be a preset fixed value or a dynamically determined value. For example, in the case where the current media content is a picture, N is a fixed value (for example, 1), i.e., the corresponding target characteristic moment may be the next characteristic moment of the preset audio to be played in the current playing progress; for another example, in the case where the current media content is a video, N is a dynamically determined numerical value, and may be determined according to the video duration, i.e., the corresponding target characteristic moment is determined according to the video duration of the current media content, and this is because when the first characteristic moment to be played arrives, the current video may not be played completely, and therefore it is necessary to switch to the next video only after the current video is played completely and when the Nth characteristic moment arrives.

For example, the current media content is a picture, and the corresponding target characteristic moment is the next characteristic moment to be played in the preset audio. If the first characteristic moment after 1 minute and 17 seconds is 1 minute and 20 seconds, the target characteristic moment is determined to be 1 minute and 20 seconds.

In step 103, when a playing progress of the preset audio reaches the target characteristic moment, the preset presenting interface is controlled to switch from presenting the current media content to presenting the next media content.

In an exemplary embodiment, after the target characteristic moment is determined, the presenting of the current media content may continue to be maintained and the preset audio may continue to be played, and the playing progress of the preset audio may be detected in real time, and when the playing progress reaches the target characteristic moment, the switching among the media contents is triggered, i.e., the current media content is automatically switched to the next media content in the preset presenting interface.

A method for media content presenting provided by an embodiment of the present disclosure presents a current media content in a target media work including a preset audio and a plurality of media contents in a preset presenting interface, and plays the preset audio; a target characteristic moment is determined according to a current playing progress of the preset audio and characteristic moment information associated with the preset audio, wherein the characteristic moment includes a time point when an audio characteristic in the preset audio satisfies a preset condition, and the target characteristic moment is a characteristic moment of the preset audio to play a next media content in the current playing progress; and when a playing progress of the preset audio reaches the target characteristic moment, the preset presenting interface is controlled to automatically switch from presenting the current media content to presenting the next media content. By adopting the abovementioned technical solution, in the process for presenting the media work, a switching occasion of the media contents is dynamically determined according to a characteristic moment that has not been played in the preset audio, so the switching among the media contents more flexibly matches audio characteristic(s) of the audio, a presenting effect of real-time sticking may be achieved, and the viewing effect of the media work is improved.

In some embodiments, the presenting the current media content in the target media work in the preset presenting interface and playing the preset audio includes: controlling, in response to a media content switching operation of a user, the preset presenting interface to switch from presenting the current media content to presenting a target media content, maintaining the presenting of the target media content, and continuing to play the preset audio, wherein the target media content is the next media content or a previous media content for the current media content. An advantage of this setting is that the user is allowed to manually switch media contents so that the user is more free to view the media contents in the media work.

In an exemplary embodiment, the media content switching operation may be a first preset gesture operation, for example, a sliding operation, etc. and may be determined to switch to the next media content (for example, corresponding to sliding to the left) or the previous media content (for example, corresponding to sliding to the right) of the current media content according to an action direction of the first preset gesture operation. After the switching, maintaining the presenting of the switched target media content may also be understood as switching from an automatic switching mode to a manual switching mode, and at this time, the switching among the media contents is performed in the operation of the user, i.e., the switching occasion is determined according to the input moment of the media content switching operation input by the user. In the manual switching mode, the continuous playing of the preset audio may be supported to ensure the viewing effect of the media content.

In some embodiments, after the maintaining the presenting of the target media content and continuing to play the preset audio, further comprising: determining, in response to an automatic switching resumption operation of the user, a target characteristic moment in real time according to the current playing progress of the preset audio and the characteristic moment information; controlling, when the playing progress of the preset audio reaches the target characteristic moment, the switching from presenting the current media content to presenting the next media content in the preset presenting interface. An advantage of this setting is that after the automatic switching mode is resumed in the operation of the user, the target characteristic moment for switching to the next media content is re-determined, enabling the media content switching that re-matches the audio characteristic.

In an exemplary embodiment, the automatic switching resumption operation may be a triggering operation (such as clicking, etc.) for a preset resumption button; alternatively, the automatic switching resumption operation may be a second preset gesture operation that acts on the preset presenting interface, and the second preset gesture operation may be decomposed into two gesture operations, for example, inputting a preset pause operation and then inputting a preset play operation, wherein the preset pause operation and preset play operation may be the same or different, for example, both are clicking operations. It is to be understood that the automatic switching resumption operation of the user may also be that the user has no operation after a preset period, etc.

In an exemplary embodiment, after the user inputs the automatic switching resumption operation, the automatic switching is restarted with the playing progress at the input moment of the operation as a starting point and the next media content as the first media content. For example, the user slides from the second media content to the third media content through a sliding operation, the presenting of the media content will stop at the third media content, and the preset audio is continuously played by the second characteristic moment (the process is not affected); if the user does not continue to switch the media contents, and before the preset audio is played to the eighth accent, the automatic switching resumption operation is input to enable the media work to resume the carousel, and at this time, the entire media work may continue playing with sticking by taking the fourth media content and the eighth accent (the target characteristic moment) as a new corresponding relationship.

In some embodiments, further comprising: maintaining, in response to a preset pause operation of a user, the presenting of the current media content and pausing the playing of the preset audio. An advantageous of this setting is in that the user may be allowed to quickly achieve the simultaneous pausing of the automatic switching among the media contents and the playing of the preset audio by inputting the preset pause operation, improving the convenience of the pause operation.

In some embodiments, after the maintaining the presenting of the current media content and pausing the playing of the preset audio, further comprising: controlling, in response to a media content switching operation of the user, the preset presenting interface to switch from presenting the current media content to presenting the target media content, maintaining the presenting of the target media content, and maintaining the playing of the preset audio paused, wherein the target media content is the next media content or a previous media content for current media content. An advantageous of this setting is in that the user is allowed to freely switch the media contents after the media work is paused and to maintain the playing of the audio paused during the switching process so as to meet the user's diverse media content viewing needs. Here, the media content switching operation may be the same as the above media content switching operation and will not be described again.

In some embodiments, in the process of maintaining the playing of the preset audio paused, further comprising: determining, in response to a preset pause cancelling operation of the user, a target characteristic moment according to the current playing progress of the preset audio and the characteristic moment information, and continuing to play the preset audio; when the playing progress of the preset audio reaches the target characteristic moment, automatically switching from presenting the current media content to presenting the next media content in the preset presenting interface. An advantage of this setting is that when the user cancels the pause on the media work, the automatic switching mode may be resumed, the target characteristic moment for switching to the next media content is re-determined, and the media content switching that re-matches the audio characteristic is implemented.

In some embodiments, where in the case where the current media content is a video, a corresponding target characteristic moment is determined according to a video duration of the current media content. Alternatively, in the case where the current media content is a video, the corresponding target characteristic moment is a characteristic moment of the preset audio to be played in the current playing progress when complete playing of the current media content is able to be satisfied and that is numbered as a preset one from a moment at which the playing of the current media content is completed. An advantage of this setting is that the switching among the media contents matches the characteristic moment while the complete playing of video segments is guaranteed. Here, the number of the preset one may be set according to actual requirements, such as 1 or 2.

Alternatively, the number of the preset one is 1, i.e., the characteristic moment to be played which is closest to the moment when the playing of the current media content is completed. In an exemplary embodiment, the duration for the current video segment being not played is 10 seconds, the current playing progress is 1 minute and 17 seconds, and the following characteristic moments are 1 minute and 20 seconds, 1 minute and 22 seconds, 1 minute and 26 seconds, and 1 minute and 29 seconds; if the current video segment is played completely, it needs to be played to 1 minute and 27 seconds, which is between 1 minute and 26 seconds and 1 minute and 29 seconds; and at this time, 1 minute and 29 seconds may be determined as the target characteristic moment.

In an exemplary embodiment, the controlling, when the playing progress of the preset audio reaches the target characteristic moment, the preset presenting interface to switch from presenting the current media content to presenting the next media content includes: after all of video frames of the current media content have been played, maintaining the presenting of a video frame at a preset position in the current media content, and controlling, when the playing progress of the preset audio reaches the target characteristic moment, the preset presenting interface to switch from presenting the current media content to presenting the next media content. An advantage of this setting is that after the video playing is completed, if the switching moment is not reached, the blank period is filled with the presenting of the video frame at the preset position (such as the last video frame), so as to ensure the continuity of the media content presenting, thereby ensuring the viewing effect.

In some embodiments, the controlling, when the playing progress of the preset audio reaches the target characteristic moment, the preset presenting interface to switch from presenting the current media content to presenting the next media content includes: after all of the video frames of the current media content have been played, presenting a first transition picture, and controlling, when the playing progress of the preset audio reaches the target characteristic moment, the preset display interface to switch from presenting the current media content to presenting the next media content. The first transition picture may include at least n frames of a subsequent video, or n frames of a previous video and n frames of a subsequent video. An advantage of this setting is that after the video playing is completed, if the switching moment is not reached, the blank period is filled with the presenting of the first transition picture, so as to ensure the fluency of the presenting of the media content, and make the switching between two media contents more natural, thereby ensuring the viewing effect.

In an exemplary embodiment, the first transition picture may include at least one of a last frame of a previous video or a first frame of a subsequent video, in a non-limiting manner, such as vertical curtain drawing erasing transition, color dissolving transition, and lens steering transition.

In some embodiments, in the case where the current media content is a video, a corresponding target characteristic moment is a characteristic moment of the preset audio in the current playing progress that is number as preset one before the current media content is completely played. This ensures the continuity of the presenting of the media content and the viewing effect. Here, the number of the preset one may be set according to actual requirements, such as 1 or 2.

In some embodiments, the controlling, when the playing progress of the preset audio reaches the target characteristic moment, the preset presenting interface to switch from presenting the current media content to presenting the next media content includes: after the playing progress of the preset audio reaches the target characteristic moment, presenting a second transition picture, the second transition picture including a video frame of the current media content which is not played. An advantage of this setting is that by adding the second transition picture containing the unplayed video frame, the switching among the media contents is made more natural on the basis of ensuring that the switching occasion matches the audio characteristic. Here, the transition mode is not limited, such as vertical curtain drawing, erasing transition, color dissolving transition and lens steering transition, etc. In an exemplary embodiment, in the case where the current media content is a video, a corresponding target characteristic moment is a first characteristic moment before the current media content is completely played, and after the playing progress of the preset audio reaches the target characteristic moment, a curtain drawing transition picture is presented, and the second transition picture includes an unplayed video frame of the current media content from the target characteristic moment to the completion of playing.

In some embodiments, in the case where the current media content is a video, a corresponding target characteristic moment may be a characteristic moment to be played that is closest to the expected moment of the completion of the playing of the current media content. As exemplified above, 1 minute and 26 seconds is closer to 1 minute and 27 seconds than 1 minute and 29 seconds, and 1 minute and 26 seconds may be determined as the target characteristic moment. In this way, in the case where the playing of the current video segment is not completed, when the target characteristic moment is reached, the next media content will be automatically switched to improve the continuity of the playing of two segments of media contents.

In some embodiments, the determining the target characteristic moment in real time according to the current playing progress of the preset audio and characteristic moment information corresponding to the characteristic moment associated with the preset audio includes: acquiring a target file corresponding to the target media work, the target file including a plurality of target image resources, a target audio resource and a configuration file corresponding to a plurality of media contents, wherein the target image resources and the target audio resource are independent from each other; acquiring the characteristic moment information based on the configuration file; acquiring the current playing progress of the target audio resource, and determining a target characteristic moment based on the current playing progress and characteristic moment information, wherein the target characteristic moment is set to control the playing of the plurality of target image resources. The image resources may include a picture file and a video files, among others. An advantage of this setting is that the target image resource and target audio resource are independent from each other so that resources corresponding to the same media content may be switched at different characteristic moments based on different operations of the user (for example, realizing different rhythm points based on different operations of the user). However, the video with sticking points in the related art combines picture(s) or video(s) and audio into one file in advance, and therefore, the point at which each media content is stuck in the related art is fixed, and in technical solutions of embodiments of the present disclosure, a more flexible real-time sticking effect may be realized.

It is to be understood that when the viewing user desires to download the target media work, the video with sticking points may be generated for the user to download based on the combining of the plurality of target image resources, target audio resource, and configuration file described above.

Figure 2:
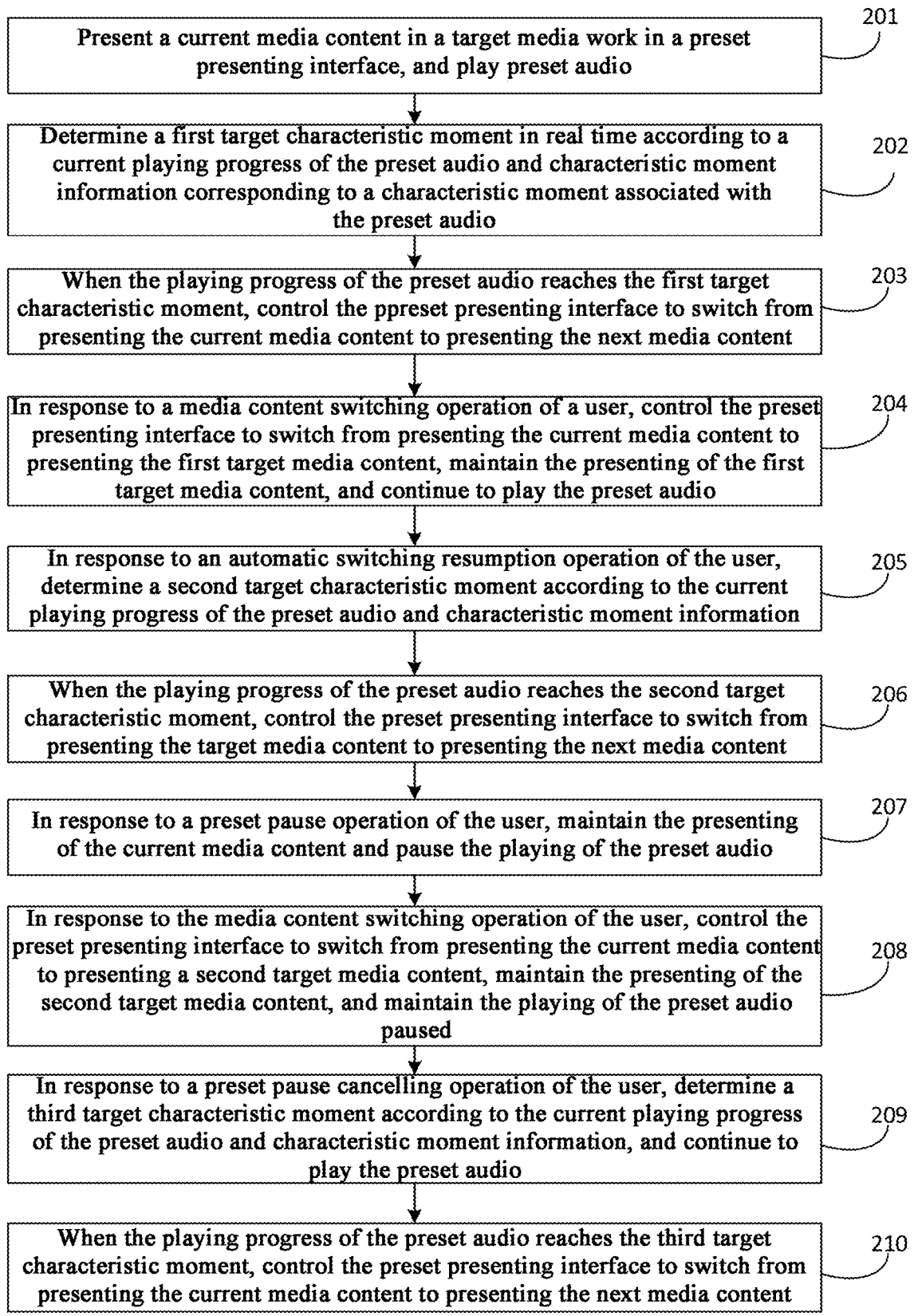
FIG. 2 is a flowchart of a method for media content presenting provided by an embodiment of the present disclosure.

FIG. 2 is a flowchart of a method for media content presenting provided by an embodiment of the present disclosure, and the embodiment of the present disclosure is optimized on the basis of the alternatives in the above-mentioned embodiments. In an exemplary embodiment that takes the media work as a picture work, the method comprises the following steps:

In step 201, presenting a current media content in a target media work in a preset presenting interface, and playing a preset audio, wherein the preset audio and a plurality of media contents are included in the target media work, and the media content includes a picture.

Figure 3:
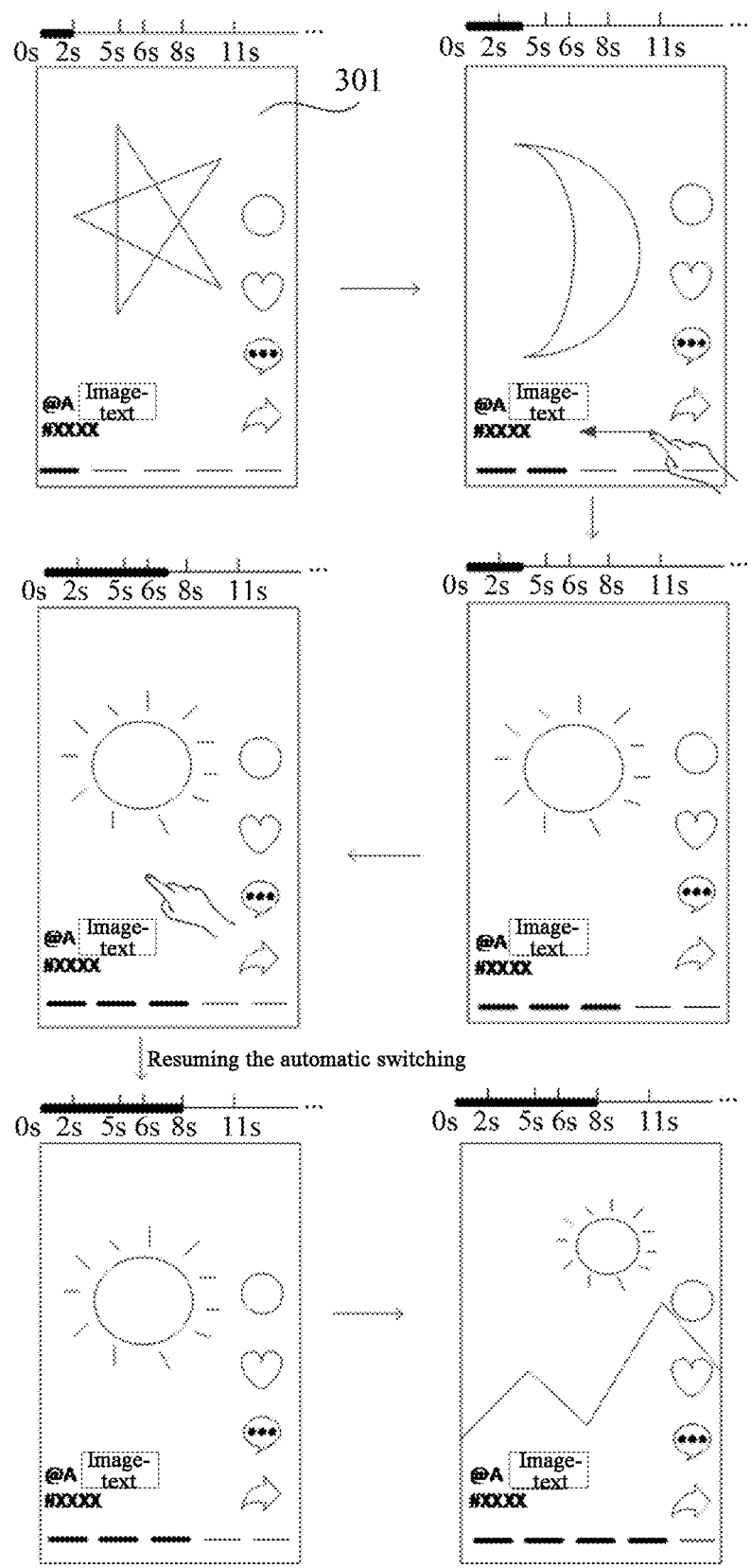
FIG. 3 is a schematic diagram of interface interaction according to an embodiment of the present disclosure.

FIG. 3 is a schematic diagram for interface interaction provided by an embodiment of the present disclosure. As shown in FIG. 3, the first picture in a target media work, that is a star picture, starts to be displayed in a preset presenting interface 301; at the bottom of the preset presenting interface 301, short lines may be used to represent the number of pictures in the target media work; bold short lines represent the pictures that have been displayed or are being displayed in this round; and thin short lines represent the pictures that have not been displayed in this round.

In step 202, determining a first target characteristic moment in real time according to a current playing progress of the preset audio and characteristic moment information corresponding to a characteristic moment associated with the preset audio.

wherein the characteristic moment includes a moment at which an accent is located, and the target characteristic moment is a next characteristic moment to be played in the preset audio in the current playback progress.

As shown in FIG. 3, for the convenience of explanation, a playing progress bar (corresponding to the characteristic moment information) of the preset audio is shown above each interface diagram, the characteristic moments in the preset audio include 2 s (seconds), 5 s, 6 s, 8 s and 11 s, etc. and subsequent characteristic moments are omitted and not shown. When the first picture is displayed, the characteristic moment to be played next may be determined as the first target characteristic moment according to the current playing progress of the preset audio (e.g. the progress is 0 s or close to 0 s when the playing starts) and the characteristic moment information associated with the preset audio, and as shown in FIG. 3, the first target characteristic moment is 2 s at this time.

In step 203, when the playing progress of the preset audio reaches the first target characteristic moment, controlling the preset presenting interface to switch from presenting the current media content to presenting the next media content.

In an exemplary embodiment, as the preset audio is played, the playing progress proceeds, and when the first target characteristic moment is reached, it is automatically switched to display the next picture. As shown in FIG. 3, black bold lines in the playing progress bar is set to indicate the playing progress, and when the playing progress reaches 2 s, it is automatically switched to display the second picture (a moon picture).

In step 204, in response to a media content switching operation of a user, controlling the preset presenting interface to switch from presenting the current media content to presenting the first target media content, maintaining the presenting of the first target media content, and continuing to play the preset audio.

Wherein the first target media content is a next media content or a previous media content for the current media content.

In an exemplary embodiment, as shown in FIG. 3, when the moon picture is displayed, the corresponding first target characteristic moment may be determined as 5 s; before the playing progress of the preset audio does not reach 5 s (3.5 s in the figure), the user inputs a leftward sliding operation (a media content switching operation), and at this time, without waiting for 5 s, the operation of the user may be immediately responded to and it is switched to display a third picture (a sun picture), and at this time, the presenting of the sun picture would be maintained and the preset audio would continue to be played. Subsequently, while the preset audio continues to be played, the user may further continue to freely perform picture switching by inputting a leftward sliding operation or a rightward sliding operation, and in the process of the user's free switching, the picture is no longer played with the sticking points but completely follows the user's control.

In step 205, in response to an automatic switching resumption operation of the user, determining a second target characteristic moment according to the current playing progress of the preset audio and characteristic moment information;

As shown in FIG. 3, in the process for presenting the sun picture, the user wants to resume the automatic switching mode of the picture, and may input an automatic switching resumption operation (input at 7 s in the figure); if a preset pause operation (such as a clicking operation) is input first, and then a preset pause cancelling operation is input (such as inputting a clicking operation with regard to a play control), then it may be considered that the user triggers to resume the automatic switching mode, and at this time, according to the current playing progress and characteristic moment information, the current second target characteristic moment is determined as a characteristic moment to be played next, i.e., 8 s, and the presenting of the sun picture is continued.

In step 206, when the playing progress of the preset audio reaches the second target characteristic moment, controlling the preset presenting interface to switch from presenting the target media content to presenting the next media content.

As shown in FIG. 3, as the preset audio continues to be played, when the playing progress reaches 8 s, it may be automatically switched to present the fourth picture (a landscape picture).

In step 207, in response to the preset pause operation of the user, maintaining the presenting of the current media content, and pausing the playing of the preset audio.

Figure 4:
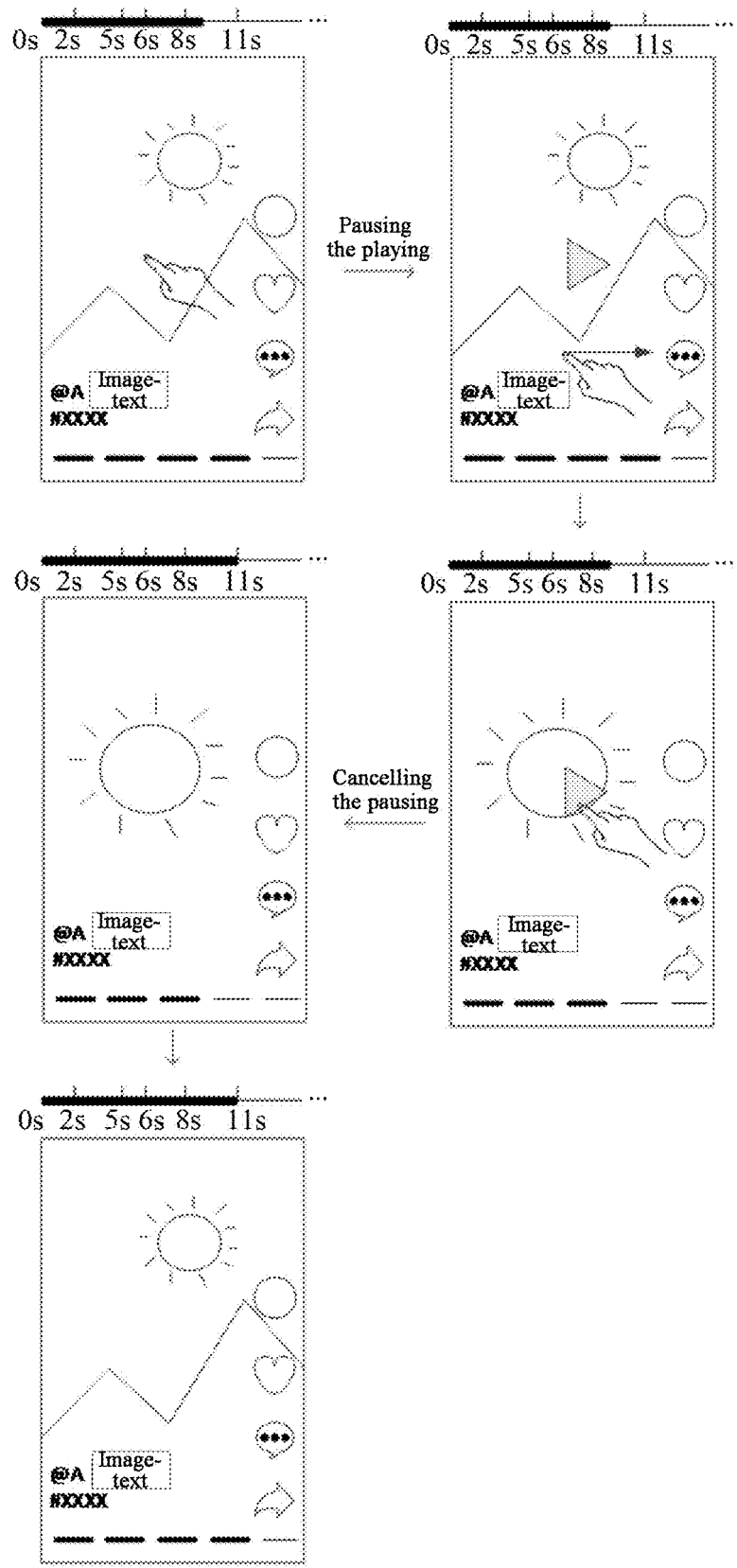
FIG. 4 is yet another schematic diagram of interface interaction provided by an embodiment of the present disclosure.

FIG. 4 is a yet another schematic diagram for interface interaction provided by an embodiment of the present disclosure, and it is assumed that on the basis of the last interface in FIG. 3, the playing is continued, and before the next characteristic moment 11 s is reached, a preset pause operation (such as a clicking operation) is input by a user (such as input at 9 s), the presenting of the landscape picture is maintained, and the playing of the preset audio is paused.

In step 208, in response to the media content switching operation of the user, controlling the preset presenting interface to switch from presenting the current media content to presenting a second target media content, maintaining the presenting of the second target media content, and maintaining the playing of the preset audio paused.

Wherein the second target media content is a next media content or a previous media content for the current media content.

As shown in FIG. 4, the user may input a rightward sliding operation to browse the previous sun picture, and during the process for switching pictures, the preset audio remains paused and the progress bar is not moving.

In step 209, in response to a preset pause cancelling operation of the user, determining a third target characteristic moment according to the current playing progress of the preset audio and characteristic moment information, and continuing to play the preset audio;

As shown in FIG. 4, when the user inputs the preset pause cancelling operation (such as a clicking operation for a play control), the preset audio may continue to be played, and the next characteristic moment is determined as the third target characteristic moment, i.e., 11 s.

In step 210, when the playing progress of the preset audio reaches the third target characteristic moment, controlling the preset presenting interface to switch from presenting the current media content to presenting the next media content.

As shown in FIG. 4, when the playing progress of the preset audio reaches 11 s, it is automatically switched to a next landscape picture that presents the sun picture.

It should be noted that the order of the steps described above may vary. For example, the steps 207-210 may precede the steps 204-206, etc.

A method for media content presenting provided by an embodiment of the present disclosure, in the process for presenting a media work, in an automatic switching mode, dynamically determines a switching occasion for a media content according to a characteristic moment that is not played in a preset audio. The method supports that it enters a manual switching mode, and in the manual switching mode, the user may freely control the switching among pictures, and flexibly control the pausing and playing of the preset audio. After the automatic switching mode is resumed, the method continuously dynamically determines the automatic switching moment of the media content according to the characteristic moment that is not played in the preset audio. There is no strict binding relationship between the media content and the characteristic moment, and music would not jump when the user resumes the playing with sticking after manually switching the media content, so the switching of the media content more flexibly matches the audio characteristic of the audio, and the presenting effect of the real-time sticking may be achieved, and the viewing effect of the media work is improved while the user's autonomous switching capability is ensured.

Figure 5:
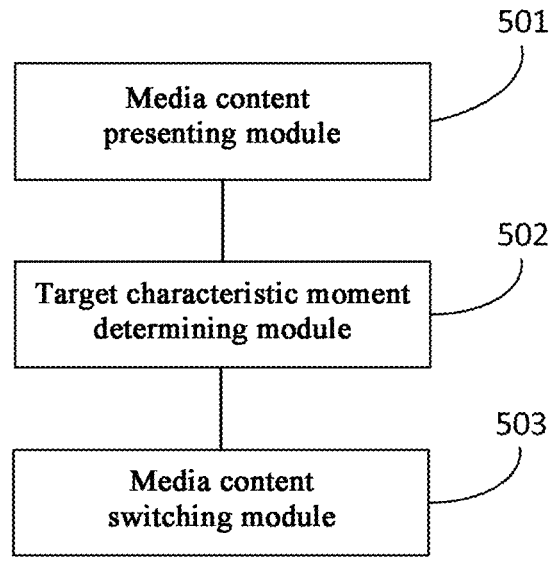
FIG. 5 is a schematic structural diagram of an apparatus for media content presenting according to an embodiment of the present disclosure.

FIG. 5 is a schematic structural diagram of an apparatus for media content presenting provided by an embodiment of the present disclosure, and as shown in FIG. 5, the apparatus comprises: a media content presenting module 501, a target characteristic moment determining module 502 and a media content switching module 503.

A media content presenting module (501) is configured to present a current media content in a target media work in a preset presenting interface and play a preset audio, wherein the preset audio and a plurality of media contents are included in the target media work, and the media contents includes at least one of a picture or a video;

A target characteristic moment determining module (502) is configured to determine a target characteristic moment in real time according to a current playing progress of the preset audio and characteristic moment information corresponding to a characteristic moment associated with the preset audio, wherein the characteristic moment includes a time point when an audio characteristic in the preset audio satisfies a preset condition, and the target characteristic moment is a characteristic moment of the preset audio to play a next media content in the current playing progress;

A media content switching module (503) is configured to control, when a playing progress of the preset audio reaches the target characteristic moment, the preset presenting interface to switch from presenting the current media content to presenting the next media content.

An apparatus for media content presenting provided by an embodiment of the present disclosure presents a current media content in a target media work including a preset audio and a plurality of media contents in a preset presenting interface, and plays the preset audio; determines a target characteristic moment according to a current playing progress of the preset audio and characteristic moment information associated with the preset audio, wherein the characteristic moment includes a time point when an audio characteristic in the preset audio satisfies a preset condition, and the target characteristic moment is a characteristic moment to be played in the preset audio; and when the playing progress of the preset audio reaches the target characteristic moment, automatically switches from presenting the current media content to presenting the next media content in the preset presenting interface. By using the above-mentioned technical solutions, in the process for presenting a media work, a switching moment of the media content is dynamically determined according to a characteristic moment that is not played in the preset audio, so the switching among the media contents more flexibly matches the audio characteristic of the audio, the presenting effect of real-time sticking may be achieved, and the viewing effect on the media work is improved.

Optionally, the media content presenting module, for example, is configured to, control, in response to a media content switching operation of a user, the preset presenting interface to switch from presenting the current media content to presenting a target media content, maintain the presenting of the target media content, and continue to play the preset audio, wherein the target media content is the next media content or a previous media content for the current media content.

Optionally, the apparatus further comprises:
a resumption operation responding module configured to determine, in response to an automatic switching resumption operation of the user after the presenting of the target media content is maintained and the preset audio continues to be played, a target characteristic moment in real time according to the current playing progress of the preset audio and the characteristic moment information;
wherein the media content switching module is further configured to control the preset presenting interface to automatically switch from presenting the current media content to presenting the next media content when the playing progress of the preset audio reaches the target characteristic moment.

Optionally, the apparatus further comprises:
a pause responding module configured to maintain, in response to a preset pause operation of a user, the presenting of the current media content and pause the playing of the preset audio.

Optionally, the apparatus further comprises:
a second switching operation responding module configured to, after maintaining the presenting of the current media content and pausing the playing of the preset audio, control, in response to a media content switching operation of the user, the preset presenting interface to switch from presenting the current media content to presenting the target media content, maintain the presenting of the target media content, and maintain the playing of the preset audio paused, wherein the target media content is the next media content or a previous media content for the current media content.

Optionally, the apparatus further comprises:
a pause cancelling responding module, configured to in the process for maintaining the playing of the preset audio paused, determine, in response to a preset pause cancelling operation of the user, a target characteristic moment in real time according to the current playing progress of the preset audio and the characteristic moment information, and continue to play the preset audio;
Wherein the media content switching module is further configured to control, when the playing progress of the preset audio reaches the target characteristic moment, the preset presenting interface to switch from presenting the current media content to presenting the next media content.

Optionally, in the case where the current media content is a picture, a corresponding target characteristic moment is a next characteristic moment of the preset audio to be played in the current playing progress.

Optionally, in the case where the current media content is a video, a corresponding target characteristic moment is determined according to a video duration of the current media content.

Optionally, in the case where the current media content is a video, a corresponding target characteristic moment is a characteristic moment of the preset audio to be played in the current playing progress when complete playing of the current media content is able to be satisfied and that is numbered as a preset one from a moment at which the playing of the current media content is completed.

Optionally, the controlling, when the playing progress of the preset audio reaches the target characteristic moment, the preset presenting interface to switch from presenting the current media content to presenting the next media content includes:
after all of video frames of the current media content have been played, maintaining the presenting of a video frame at a preset position in the current media content, and controlling, when the playing progress of the preset audio reaches the target characteristic moment, the preset presenting interface to switch from presenting the current media content to presenting the next media content.

Optionally, the characteristic moment includes a moment at which an accent is located.

Optionally, the controlling, when the playing progress of the preset audio reaches the target characteristic moment, the preset presenting interface to switch from presenting the current media content to presenting the next media content includes:
after all of the video frames of the current media content have been played, presenting a first transition picture, and controlling, when the playing progress of the preset audio reaches the target characteristic moment, the preset presenting interface to switch from presenting the current media content to presenting the next media content.

Optionally, in the case where the current media content is a video, a corresponding target characteristic moment is a characteristic moment of the preset audio in the current playing progress that is number as preset one before the current media content is completely played.

Optionally, the controlling, when the playing progress of the preset audio reaches the target characteristic moment, the preset presenting interface to switch from presenting the current media content to presenting the next media content includes:
after the playing progress of the preset audio reaches the target characteristic moment, presenting a second transition picture, the second transition picture including a video frame of the current media content which is not played.

Optionally, the target characteristic moment determining module includes:
a file acquiring unit configured to acquire a target file corresponding to the target media work, the target file including a plurality of target image resources, a target audio resource and a configuration file corresponding to a plurality of media contents, wherein the target image resources and the target audio resource are independent from each other;

a characteristic moment information acquiring unit configured to acquire the characteristic moment information based on the configuration file;

a target characteristic moment determining unit configured to acquire a current playing progress of the target audio resource, and determine a target characteristic moment based on the current playing progress and the characteristic moment information, wherein the target characteristic moment is set to control the playing of the plurality of target image resources.

The apparatus for media content presenting provided by an embodiment of the present disclosure can perform a method for media content presenting provided by any embodiment of the present disclosure, and has corresponding functional modules and effects for performing the method.

It should be noted that the units and modules included in the above-mentioned apparatus are merely divided according to functional logic, but are not limited to the above-mentioned division, as long as corresponding functions can be realized; in addition, the names of the functional units are merely for the convenience of distinguishing each other and are not intended to limit the scope of the disclosed embodiments.

Figure 6:
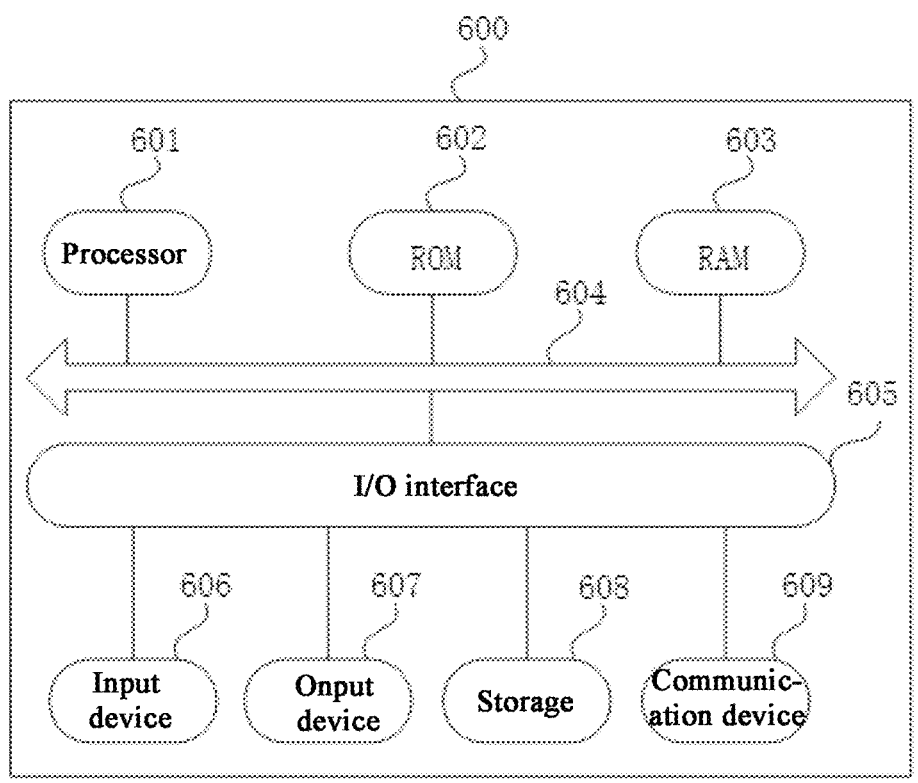
FIG. 6 is a schematic structural diagram of an electronic device according to an embodiment of the present disclosure.

FIG. 6 is a schematic structural diagram of an electronic device according to an embodiment of the present disclosure. Reference is now made to FIG. 6, which illustrates a schematic structural diagram of an electronic device (e.g. a terminal device or server in FIG. 6) 600 suitable for implementing embodiments of the present disclosure. The terminal device in embodiments of the present disclosure may include, but is not limited to, a mobile terminal such as a mobile phone, a notebook computer, a digital broadcast receiver, a personal digital assistant (PDA), a tablet computer (PAD), a portable media player (PMP), an in-vehicle terminal (e.g. an in-vehicle navigation terminal), etc. and a fixed terminal such as a digital TV, a desktop computer, etc. The electronic device shown in FIG. 6 is merely an example and should not impose any limitation on the functionality and scope of use of embodiments of the present disclosure.

As shown in FIG. 6, the electronic device 600 may include a processor (e.g. central processor, graphics processor, etc.) 601 that may perform various suitable actions and processes in accordance with programs stored in a read-only memory (ROM) 602 or loaded from a storage 608 into a random access memory (RAM) 603. In the RAM 603, various programs and data required for the operation(s) of the electronic device 600 are also stored. The processor 601, the ROM 602 and the RAM 603 are connected to each other via a bus 604. An input/output (I/O) interface 605 is also coupled to the bus 604.

In general, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, etc.; a storage 608 including, for example, a magnetic tape, a hard disk, etc.; and a communication device 609. The communication device 609 may allow the electronic device 600 to communicate wirelessly or wired with other devices to exchange data. While FIG. 6 illustrates an electronic device 600 having various devices, it is to be understood that not all illustrated devices are required to be implemented or provided. More or fewer devices may alternatively be implemented or provided.

In particular, the processes described above with reference to flowcharts may be implemented as computer software programs in accordance with embodiments of the present disclosure. For example, embodiments of the present disclosure include a computer program product comprising a computer program embodied on a non-transitory computer-readable medium, the computer program including program code for performing the method illustrated by the flowcharts. In such embodiments, the computer program may be downloaded and installed from a network via the communication device 609, or be installed from the storage 608, or be installed from the ROM 602. When the computer program is executed by the processor 601, it performs the above-described functions defined in a method of an embodiment of the present disclosure.

The electronic device provided by embodiments of the present disclosure belongs to the same concept as a method for media content presenting provided by the above-mentioned embodiments, and technical details not described in detail in the embodiments can be referred to the above-mentioned embodiments, and the embodiments have the same effects as the above-mentioned embodiments.

Embodiments of the present disclosure provide a computer-readable storage medium on which a computer program is stored, and the program, when executed by a processor, implements a method for media content presenting provided by the embodiments as described above.

Note that the computer-readable storage medium described above in the disclosure can be either a computer-readable signal medium or a computer-readable storage medium or any combination thereof. The computer-readable storage medium may be, for example but not limited to, an electronic, magnetic, optical, electromagnetic, infrared, or semiconductor system, apparatus, or device, or any combination thereof. Examples of the computer readable storage medium may include, but are not limited to: an electrical connection having at least one wire, a portable computer diskette, a hard disk, a random access memory (RAM), a programmable memory (ROM), an erasable read-only memory (EPROM), a flash memory, an optical fiber, a compact disc read-only memory (CD-ROM), an optical storage device, a magnetic storage device, or any suitable combination thereof. In the disclosure, the computer-readable storage medium may be any tangible medium that contains or stores a program that can be used by or in connection with an instruction execution system, apparatus, or device. However, in the disclosure, the computer-readable signal medium may include a data signal propagated in baseband or as part of a carrier wave, on which computer-readable program code is embodied. Such propagated data signal may take many forms, including but not limited to, an electromagnetic signal, an optical signal, or any suitable combination thereof. The computer-readable signal medium may also be any computer-readable storage medium other than the computer-readable storage that can send, propagate, or transfer the program for use by or in connection with the instruction execution system, apparatus, or device. The program code embodied on the computer-readable storage medium may be transmitted over any suitable medium including, but not limited to: wire, optic cable, radio frequency (RF), and the like, or any suitable combination thereof.

In some implementations, clients, servers may communicate using any currently known or future developed network protocol, such as HTTP (Hyper Text Transfer Protocol), and may be interconnected with any form or medium of digital data communication (e.g. a communication network). Examples of the communication network include a local area network (LAN), a wide area network (WAN), an internetwork (e.g. the Internet), a peer-to-peer network (e.g. an ad hoc peer-to-peer network), and any currently known or future developed network.

The computer-readable storage medium may be contained in the electronic device; it may also be present separately and not fitted into the electronic device.

The computer-readable storage medium carries at least one program that, when executed by the electronic device, causes the electronic device to: present a current media content in a target media work in a preset presenting interface and play a preset audio, wherein the preset audio and a plurality of media contents are included in the target media work, and the media contents includes at least one of a picture or a video; determine a target characteristic moment in real time according to a current playing progress of the preset audio and characteristic moment information corresponding to a characteristic moment associated with the preset audio, wherein the characteristic moment includes a time point when an audio characteristic in the preset audio satisfies a preset condition, and the target characteristic moment is a characteristic moment of the preset audio to play a next media content in the current playing progress; control, when a playing progress of the preset audio reaches the target characteristic moment, the preset presenting interface to switch from presenting the current media content to presenting the next media content.

Computer program code for carrying out operations of the present disclosure may be written in at least one programming language including, but not limited to, an object oriented programming language such as Java, Smalltalk, C++, and conventional procedural programming languages, such as the "C" language or similar programming languages, or a combination thereof. The program code may be executed entirely on the user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or the connection may be made to an external computer (e.g. through the Internet using an Internet Service Provider).

The flowchart and block diagram in the Figures illustrate the architecture, functionality, and operation of possible implementations of systems, methods and computer program products according to various embodiments of the present disclosure. In this regard, each block in the flowchart or block diagram may represent a module, segment, or portion of code, which includes one or more executable instructions for implementing the specified logical function(s). It should also be noted that in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagram and/or flowchart, and combinations of blocks in the block diagram and/or flowchart, can be implemented by special purpose hardware-based systems which perform the specified functions or operations, or combinations of special purpose hardware and computer instructions.

The units described in connection with the embodiments disclosed herein may be implemented in software or hardware. The name of a module does not constitute a definition of the module itself, for example, a media content switching module may also be described as "when the playing progress of the preset audio reaches the target characteristic moment, controlling the preset presenting interface to automatically switch from presenting the current media content to presenting the next media content".

The functions described herein above may be performed, at least in part, by one or more hardware logic component(s). For example, an exemplary type of hardware logic component that may be used includes: a field programmable gate array (FPGA), an application specific integrated circuit (ASIC), an application specific standard product (ASSP), a system on a chip (SOC), a complex programmable logic device (CPLD), and the like, which is not limiting herein.

In the context of this disclosure, the machine-readable medium can be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium include an electrical connection based on one or more wire(s), a portable computer diskette, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any suitable combination thereof.

According to one or more embodiments of the present disclosure, example 1 provides a method for media content presenting comprising:
  presenting a current media content in a target media work in a preset presenting interface and playing a preset audio, wherein the preset audio and a plurality of media contents are included in the target media work, and the media contents includes at least one of a picture or a video;
  determining a target characteristic moment in real time according to a current playing progress of the preset audio and characteristic moment information corresponding to a characteristic moment associated with the preset audio, wherein the characteristic moment includes a time point when an audio characteristic in the preset audio satisfies a preset condition, and the target characteristic moment is a characteristic moment of the preset audio to play a next media content in the current playing progress;
  controlling, when a playing progress of the preset audio reaches the target characteristic moment, the preset presenting interface to switch from presenting the current media content to presenting the next media content.

According to one or more embodiments of the present disclosure, example 2 is provided according to the method of example 1, wherein the presenting the current media content in the target media work in the preset presenting interface and playing the preset audio includes:

controlling, in response to a media content switching operation of a user, the preset presenting interface to switch from presenting the current media content to presenting a target media content, maintaining the presenting of the target media content, and continuing to play the preset audio, wherein the target media content is the next media content or a previous media content for the current media content.

According to one or more embodiments of the present disclosure, example 3 is provided according to the method of example 2, wherein after the maintaining the presenting of the target media content and continuing to play the preset audio, further comprising:

determining, in response to an automatic switching resumption operation of the user, a target characteristic moment in real time according to the current playing progress of the preset audio and the characteristic moment information;

controlling, when the playing progress of the preset audio reaches the target characteristic moment, the switching from presenting the current media content to presenting the next media content in the preset presenting interface.

According to one or more embodiments of the present disclosure, example 4 is provided according to the method of example 1, further comprising:

maintaining, in response to a preset pause operation of a user, the presenting of the current media content and pausing the playing of the preset audio;

controlling, in response to a media content switching operation of the user, the preset presenting interface to switch from presenting the current media content to presenting the target media content, maintaining the presenting of the target media content, and maintaining the playing of the preset audio paused, wherein the target media content is the next media content or a previous media content for current media content;

determining, in response to a preset pause cancelling operation of the user, a target characteristic moment in real time according to the current playing progress of the preset audio and the characteristic moment information, and continuing to play the preset audio;

controlling, when the playing progress of the preset audio reaches the target characteristic moment, the preset presenting interface to switch from presenting the current media content to presenting the next media content.

According to one or more embodiments of the present disclosure, example 5 is provided according to the method of example 1, wherein in the case where the current media content is a picture, a corresponding target characteristic moment is a next characteristic moment of the preset audio to be played in the current playing progress.

According to one or more embodiments of the present disclosure, example 6 is provided according to the method of Example 1, wherein in the case where the current media content is a video, a corresponding target characteristic moment is determined according to a video duration of the current media content.

According to one or more embodiments of the present disclosure, example 7 is provided according to the method of example 6, wherein in the case where the current media content is a video, the corresponding target characteristic moment is a characteristic moment of the preset audio to be played in the current playing progress when complete playing of the current media content is able to be satisfied and that is numbered as a preset one from a moment at which the playing of the current media content is completed.

According to one or more embodiments of the present disclosure, example 8 is provided according to the method of example 7, wherein the controlling, when the playing progress of the preset audio reaches the target characteristic moment, the preset presenting interface to switch from presenting the current media content to presenting the next media content includes:

after all of video frames of the current media content have been played, maintaining the presenting of a video frame at a preset position in the current media content, and controlling, when the playing progress of the preset audio reaches the target characteristic moment, the preset presenting interface to switch from presenting the current media content to presenting the next media content.

According to one or more embodiments of the present disclosure, example 9 is according to the method of example 8, wherein the controlling, when the playing progress of the preset audio reaches the target characteristic moment, the preset presenting interface to switch from presenting the current media content to presenting the next media content includes:

after all of the video frames of the current media content have been played, presenting a first transition picture, and controlling, when the playing progress of the preset audio reaches the target characteristic moment, the preset presenting interface to switch from presenting the current media content to presenting the next media content.

According to one or more embodiments of the present disclosure, example 10 is provided according to the method of example 6, in the case where the current media content is a video, a corresponding target characteristic moment is a characteristic moment of the preset audio in the current playing progress that is number as preset one before the current media content is completely played.

According to one or more embodiments of the present disclosure, example 11 is provided according to the method of example 10, wherein the controlling, when the playing progress of the preset audio reaches the target characteristic moment, the preset presenting interface to switch from presenting the current media content to presenting the next media content includes:

after the playing progress of the preset audio reaches the target characteristic moment, presenting a second transition picture, the second transition picture including a video frame of the current media content which is not played.

According to one or more embodiments of the present disclosure, example 12 is provided according to the method of example 1, wherein the determining the target characteristic moment in real time according to the current playing progress of the preset audio and characteristic moment information corresponding to the characteristic moment associated with the preset audio includes:

acquiring a target file corresponding to the target media work, the target file including a plurality of target image resources, a target audio resource and a configuration file corresponding to a plurality of media contents, wherein the target image resources and the target audio resource are independent from each other;

acquiring the characteristic moment information based on the configuration file;

acquiring a current playing progress of the target audio resource, and determining a target characteristic moment based on the current playing progress and the characteristic moment information, wherein the target characteristic moment is set to control the playing of the plurality of target image resources.

According to one or more embodiments of the present disclosure, example 13 provides an apparatus for media content presenting comprising:

a media content presenting module configured to present a current media content in a target media work in a preset presenting interface and playing a preset audio, wherein the preset audio and a plurality of media contents are included in the target media work, and the media contents includes at least one of a picture or a video;

a target characteristic moment determining module configured to determine a target characteristic moment in real time according to a current playing progress of the preset audio and characteristic moment information corresponding to a characteristic moment associated with the preset audio, wherein the characteristic moment includes a time point when an audio characteristic in the preset audio satisfies a preset condition, and the target characteristic moment is a characteristic moment of the preset audio to play a next media content in the current playing progress;

a media content switching module configured to control, when a playing progress of the preset audio reaches the target characteristic moment, the preset presenting interface to switch from presenting the current media content to presenting the next media content.

According to one or more embodiments of the present disclosure, example 14 is provided according to the apparatus of example 13, comprising: a module for performing a method of any of examples 2-12.

According to one or more embodiments of the present disclosure, example 15 provides an electronic device comprising:

at least one processor;

a storage device configured to store at least one program, the at least one program, when executed by the at least one processor, causes the at least one processor to implement a method for media content presenting provided by embodiments of the present disclosure.

According to one or more embodiments of the present disclosure, example 16 provides a storage medium containing computer-executable instructions that, when executed by a computer processor, perform a method for media content presenting provided by embodiments of the present disclosure.

The invention claimed is:

1. A method for media content presenting comprising:
presenting a current media content in a target media work in a preset presenting interface and playing a preset audio, wherein the preset audio and a plurality of media contents are included in the target media work, and the media contents includes at least one of a picture or a video;
determining a target characteristic time point from a plurality of characteristic moments time points in real time according to a current playing progress of the preset audio and characteristic time point information corresponding to the plurality of characteristic moments time points associated with the preset audio, wherein a characteristic time point of the plurality of characteristic time points includes a time point when an audio characteristic in the preset audio satisfies a preset condition, and the target characteristic moment time point is a characteristic time point of the preset audio to play a next media content in the current playing progress; and
switching, in response to a playing progress of the preset audio reaching the target characteristic time point, the preset presenting interface from presenting the current media content to presenting the next media content.

2. The method of claim 1, wherein the presenting the current media content in the target media work in the preset presenting interface and playing the preset audio includes:
switching, in response to a media content switching operation of a user, the preset presenting interface from presenting the current media content to presenting a target media content, maintaining the presenting of the target media content, and continuing to play the preset audio, wherein the target media content is the next media content or a previous media content for the current media content.

3. The method of claim 2, wherein after maintaining the presenting of the target media content and continuing to play the preset audio, further comprising:
determining, in response to an automatic switching resumption operation of the user, a target characteristic time point in real time according to the current playing progress of the preset audio and the characteristic time point information; and
switching, when the playing progress of the preset audio reaching the target characteristic time point, from presenting the current media content to presenting the next media content in the preset presenting interface.

4. The method of claim 1, further comprising:
maintaining, in response to a preset pause operation, the presenting of the current media content and pausing the playing of the preset audio;
switching, in response to a media content switching operation of a user, the preset presenting interface from presenting the current media content to presenting a target media content, maintaining the presenting of the target media content, and maintaining the playing of the preset audio paused, wherein the target media content is the next media content or a previous media content for the current media content;
determining, in response to a preset pause cancelling operation of the user, a target characteristic time point in real time according to the current playing progress of the preset audio and the characteristic time point information, and continuing to play the preset audio; and
switching, in response to the playing progress of the preset audio reaching the target characteristic time point, the preset presenting interface from presenting the current media content to presenting the next media content.

5. The method of claim 1, wherein in the case where the current media content is a picture, a corresponding target characteristic time point is a next characteristic time point of the preset audio to be played in the current playing progress.

6. The method of claim 1, wherein in the case where the current media content is a video, a corresponding target characteristic time point is determined according to a video duration of the current media content.

7. The method of claim 6, wherein in the case where the current media content is a video, the corresponding target characteristic time point is a characteristic time point of the preset audio to be played in the current playing progress when complete playing of the current media content is able to be satisfied and that is numbered as a preset one from a time point at which the playing of the current media content is completed.

8. The method of claim 7, wherein the switching, in response to the playing progress of the preset audio reaching the target characteristic time point, the preset presenting interface from presenting the current media content to presenting the next media content includes:
after all of video frames of the current media content have been played, maintaining the presenting of a video frame at a preset position in the current media content, and switching, in response to the playing progress of the preset audio reaching the target characteristic time point, the preset presenting interface from presenting the current media content to presenting the next media content.

9. The method of claim 8, wherein the switching, in response to the playing progress of the preset audio reaching the target characteristic time point, the preset presenting interface from presenting the current media content to presenting the next media content includes:
after all of the video frames of the current media content have been played, presenting a first transition picture, and switching, in response to the playing progress of the preset audio the target characteristic time point, the preset presenting interface from presenting the current media content to presenting the next media content.

10. The method of claim 6, wherein in the case where the current media content is a video, a corresponding target characteristic time point is a characteristic time point of the preset audio in the current playing progress that is number as preset one before the current media content is completely played.

11. The method of claim 10, wherein the switching, in response to the playing progress of the preset audio reaching the target characteristic time point, the preset presenting interface from presenting the current media content to presenting the next media content includes:
after the playing progress of the preset audio reaches the target characteristic time point, presenting a second transition picture, the second transition picture including a video frame of the current media content which is not played.

12. The method of claim 1, wherein the determining the target characteristic time point from the plurality of characteristic time points in real time according to the current playing progress of the preset audio and characteristic time point information corresponding to the plurality of characteristic time points associated with the preset audio includes:
acquiring a target file corresponding to the target media work, the target file including a plurality of target image resources, a target audio resource and a configuration file corresponding to a plurality of media contents, wherein the target image resources and the target audio resource are independent from each other;
acquiring the characteristic time point information based on the configuration file; and
acquiring a current playing progress of the target audio resource, and determining a target characteristic time point based on the current playing progress and the characteristic time point information, wherein the target characteristic time point is set to control the playing of the plurality of target image resources.

13. An electronic device comprising:
at least one processor;
a storage device configured to store at least one program, wherein the at least one program, when executed by the at least one processor, causes the at least one processor to perform:
presenting a current media content in a target media work in a preset presenting interface and playing a preset audio, wherein the preset audio and a plurality of media contents are included in the target media work, and the media contents includes at least one of a picture or a video;
determining a target characteristic time point from a plurality of characteristic time points in real time according to a current playing progress of the preset audio and characteristic time point information corresponding to the plurality of characteristic time points associated with the preset audio, wherein a characteristic time point of the plurality of characteristic time points includes a time point when an audio characteristic in the preset audio satisfies a preset condition, and the target characteristic moment time point is a characteristic time point of the preset audio to play a next media content in the current playing progress; and
switching, in response to a playing progress of the preset audio reaching the target characteristic time point, the preset presenting interface from presenting the current media content to presenting the next media content.

14. The electronic device of claim 13, wherein the presenting the current media content in the target media work in the preset presenting interface and playing the preset audio includes:
switching, in response to a media content switching operation of a user, the preset presenting interface from presenting the current media content to presenting a target media content, maintaining the presenting of the target media content, and continuing to play the preset audio, wherein the target media content is the next media content or a previous media content for the current media content.

15. The electronic device of claim 13, wherein the at least one program, when executed by the at least one processor, causes the at least one processor to further perform:
maintaining, in response to a preset pause operation of a user, the presenting of the current media content and pausing the playing of the preset audio;
switching, in response to a media content switching operation of the user, the preset presenting interface from presenting the current media content to presenting a target media content, maintaining the presenting of the target media content, and maintaining the playing of the preset audio paused, wherein the target media content is the next media content or a previous media content for the current media content;
determining, in response to a preset pause cancelling operation of the user, a target characteristic time point in real time according to the current playing progress of the preset audio and the characteristic time point information, and continuing to play the preset audio; and
switching, in response to the playing progress of the preset audio reaching the target characteristic time point, the preset presenting interface to switch from presenting the current media content to presenting the next media content.

16. The electronic device of claim 13, wherein in the case where the current media content is a picture, a corresponding target characteristic time point is a next characteristic time point of the preset audio to be played in the current playing progress.

17. The electronic device of claim 13, wherein in the case where the current media content is a video, a corresponding target characteristic time point is determined according to a video duration of the current media content.

18. The electronic device of claim 17, wherein in the case where the current media content is a video, the corresponding target characteristic time point is a characteristic time point of the preset audio to be played in the current playing progress when complete playing of the current media content is able to be satisfied and that is numbered as a preset one from a time point at which the playing of the current media content is completed.

19. The electronic device of claim 13, wherein the determining the target characteristic time point from the plurality of characteristic time points in real time according to the current playing progress of the preset audio and characteristic moment time point information corresponding to the plurality of characteristic time points associated with the preset audio includes:
   acquiring a target file corresponding to the target media work, the target file including a plurality of target image resources, a target audio resource and a configuration file corresponding to a plurality of media contents, wherein the target image resources and the target audio resource are independent from each other;
   acquiring the characteristic time point information based on the configuration file; and
   acquiring a current playing progress of the target audio resource, and determining a target characteristic time point based on the current playing progress and the characteristic time point information, wherein the target characteristic time point is set to control the playing of the plurality of target image resources.

20. A non-transitory readable storage medium containing a computer program which, when executed by a computer processor, performs:
   presenting a current media content in a target media work in a preset presenting interface and playing a preset audio, wherein the preset audio and a plurality of media contents are included in the target media work, and the media contents includes at least one of a picture or a video;
   determining a target characteristic time point from a plurality of characteristic time points in real time according to a current playing progress of the preset audio and characteristic time point information corresponding to the plurality of characteristic time points associated with the preset audio, wherein a characteristic time point of the plurality of characteristic time points includes a time point when an audio characteristic in the preset audio satisfies a preset condition, and the target characteristic time point is a characteristic time point of the preset audio to play a next media content in the current playing progress; and
   switching, in response to a playing progress of the preset audio reaching the target characteristic time point, the preset presenting interface to switch from presenting the current media content to presenting the next media content.

\* \* \* \* \*